United States Patent Office 3,420,314
Patented Jan. 7, 1969

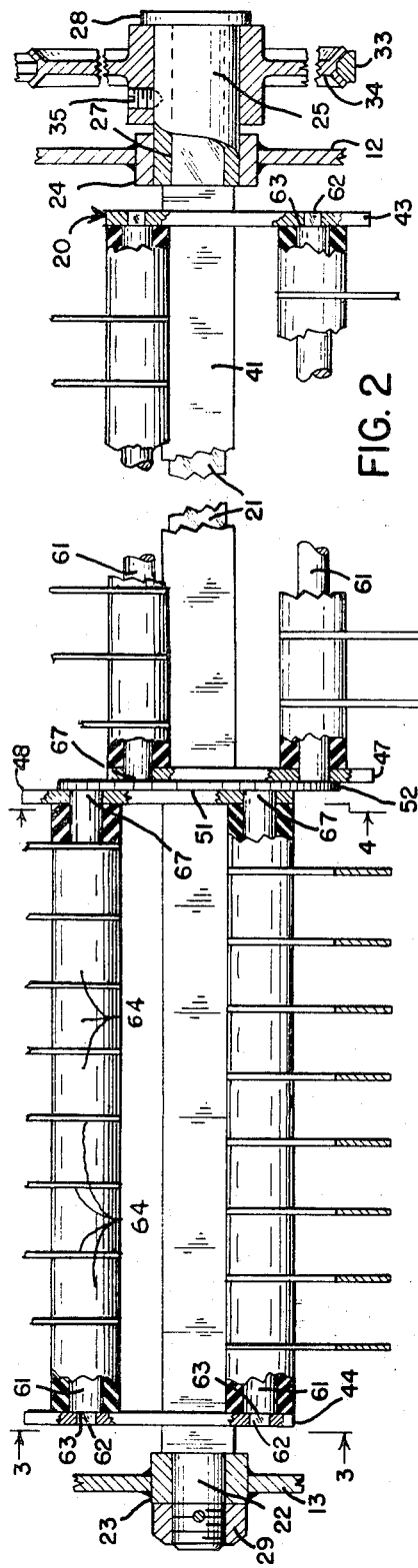

3,420,314
GROUND WORKING MACHINE
Paul F. Hastings, 1206 E. Gordon Ave.,
Spokane, Wash. 99207
Filed Oct. 26, 1966, Ser. No. 589,606
U.S. Cl. 172—42                 9 Claims
Int. Cl. B21b 45/02

The herein disclosed invention relates to ground working machines utilizing a wheel supported frame carrying a motor and, particularly, to power driven rotors therefor capable of being used for various purposes such as grass raking, grooming, cultivating, and preparing the ground for planting.

An object of the invention resides in providing a construction by means of which various types of tools, bits, tines, or blades may be quickly applied to the rotor or removed therefrom.

Another object of the invention resides in providing a construction by which the rotor may be bodily removed from the machine without interfering with the bearings or transmission and by which the same may be reversed and reinstalled.

Other objects of the invention reside in the novel combination and arrangement of parts and in the details of construction hereinafter illustrated and/or described.

In carrying out the objects of the invention, the rotor is constructed with a square tubular mandrel open at its ends and through which a square shaft may be passed. A bearing at one side of frame receives a journal on the one end of the shaft. A bearing at the other side of the frame rotatably supports a rotating bushing having a square hole through the same and through which the shaft extends, said bushing supporting a pulley or other transmission element driven by the motor. The square shaft becomes keyed to the square mandrel and also to the bushing, thereby effecting a drive betwen the pulley and rotor. Encircling the ends of the mandrel are outer hubs and intermediate these latter hubs are inner hubs, which are closely spaced and which receive therebetween a rotating locking member. The hubs on one side of the mandrel are formed with circularly arranged registering openings for the reception of spindles supporting the ground engaging elements. Similar openings in the hubs at the other side of the mandrel support similar spindles and are arranged in circumferential staggered relation with respect to the other openings. In each hub are open spaces opposite the openings in the adjoining hubs and through which the spindles may be inserted into the proper openings. A single hole in the locking member adapted to successively register wtih the holes in the inner hubs allows the spindles to be inserted one at a time. When in one position, this member locks all of the spindles in position.

In the drawings:

FIGURE 1 is a perspective view of a lawn grooming machine with an embodiment of the invention embodied therein.

FIGURE 2 is a vertical, sectional view taken on line 2—2 of FIGURE 1 and drawn to a greater scale.

FIGURE 3 is a cross sectional view taken on line 3—3 of FIGURE 2 and drawn to the same scale as FIGURE 2.

FIGURE 4 is a view similar to FIGURE 3 and taken on line 4—4 of FIGURE 2.

FIGURE 5 is a fragmentary, longitudinal, sectional view of the structure hown in FIGURE 4 with the locking member advanced to register the hole therein with the opening in one of the hubs and taken on line 4—4 of FIGURE 2.

FIGURE 6 is a sectional detail view of the device for holding the locking member in locking position.

Applicant's improved rotor and mounting therefor may be used with various types of machines utilizing ground engaging implements and for the purpose of illustration a simple lawn grooming and grass raking machine has been disclosed and which is indicated by the reference numeral 10. This machine includes a frame 11 constructed in the form of a hood having sides 12 and 13 and a top 14 connected thereto. Supporting wheels 15 are mounted on axles not shown and which are attached to the sides 12 and 13 of frame 11. A handle 16 by means of which the machine may be moved about is attached to the sides 12 and 13 and extends rearwardly of the frame.

Within the frame or hood 11 is positioned a rotor 20 which is mounted on a square shaft 21 extending through the walls 12 and 13 of the frame 11. The end of the shaft 21 is turned down to form a journal 22 which is rotatably mounted in a bearing 23 welded to the side 13 of frame 11. Attached to the side 12 of the frame 11 is another bearing 24 coaxial with bearing 23 and rotatably supporting a bushing 25. This bushing has a square hole 27 through it and through which the shaft 21 may slide. The shaft 21 has a collar 28 attached to it at one end and the journal 22 is threaded to receive a nut 29 by means of which the shaft 21 may be held in position relative to the frame 11.

For driving the shaft 21, a motor 30 is employed which is mounted on the top 14 of frame 11. This motor has attached to the driving shaft 31 thereof a pulley 32. A belt 33 passes over this pulley and over another pulley 34 secured to bushing 25 by means of a set screw 35.

The rotor 20 consists of a square tubular mandrel 41 which is formed with a square passageway 42 therethrough which slidably receives the shaft 21 and forms a driving connection therebetween. Mounted on the mandrel 41 at the ends thereof are hubs 43 and 44 which are welded to said mandrel. These hubs are platelike in form and are triangular in shape, being provided at their vertexes 45 with square openings 46. Similar hubs 47 and 48 are attached to said mandrel near the center thereof and are spaced from one another to form an annular space 51 therebetween. In the space is mounted for rotation a disc shaped locking member 52. This member has a circular hole 53 through the same forming a bearing riding on the corners 54 of the mandrel 41. The locking member 52 also has an eccentric hole 56 in it which is adapted to register with any of the openings in the hubs 47 and 48 when said locking device is properly rotated.

The hubs 47 and 48 are formed with circular openings 55 which register with the openings 46. It will be noted that all of the openings 46 and 55 are located the same distance from the axis of shaft 21 and are equally spaced circumferentially. It will also be noted that the hubs 43 and 47 are offset circumferentially 60 degrees from the hubs 48 and 44 so that the holes in plates 43 and 47 lie midway between the holes in the plates 48 and 44 as shown in FIGURE 4.

Due to the fact that the hubs 47 and 48 are triangular in form and that the openings therein are in the vertexes of the same, the openings in the adjoining hubs become exposed when the locking member 52 is positioned with its hole 56 registering with any of said openings.

The rotor 20 further includes spindles 61 which are cylindrical and which are of a diameter to slide freely in the openings 55 in hubs 47 and 48 and to pass freely through the hole 56 in the locking member 52. These spindles have square ends 62 at one end of each thereof adapted to enter the openings 46 in hubs 43 and 44 and which provide shoulders 63 engaging the hubs 43 and 44. The spindles are of such length that the opposite ends 67 butt up against the locking member 52.

Mounted on the spindles 61 are tines or blades 64 separated by means of rubber spacers 65. By means of this construction, the tines are free to rotate on the spindles 61 and are held outwardly by means of centrifugal force when the rotor is rotated. For holding the locking member 52 in locking position the hub 47 is tapped as indicated at 68 to receive a cap screw 69 whose shank passes through an opening 71 in the locking member 52.

The method of using the invention is as follows: The locking device is first rotated so that the hole 56 therein lies opposite one of the openings 55 in the hub 48. One of the spindles 61 is inserted with the end 62 leading, through the hole 56 and the particular opening 55 in the hub 48 which it overlies. The spacers 65 and tines 64 are then alternately threaded on the spindle as the same is advanced through said hole and opening. When the spindle is full the end 62 is directed into the opening 46. The spindle assembly is now in position. Locking member 52 is now advanced to the next opening 55 and the same procedure employed. If the first spindle were directed into position from the right the second would be from the left and so on. As the locking member is rotated each previously assembled spindle would be locked in position. It is preferred that the first spindle would be the one next following the bolt hole 67 so no back movement of the locking member would be required. When all of the spindles have been assembled the rotor may be held in alignment with bearings 23 and 24. Shaft 21 may now be directed through the hole 27 in bushing 25 and run through the pasageway 42 in mandrel 41. Nut 29 is next applied to journal 22 and the parts held assembled.

The advantages of the invention are manifest. The device is exceedingly simple and will not readily get out of order. The parts are easily fabricated at a low cost and can be quickly assembled. With the construction shown, the spindles are separately removable to permit of repair without completely dismantling the same. The rotor may be removed as a unit and reversed if desired.

Having described the invention, what is claimed as new and desired to be protected by Letters Patent is:

1. In a ground working machine having a wheel supported frame, the combination of:
   (a) a rotor mounted for rotation about a substantially horizontal axis transverse to the direction of travel of the machine, said rotor comprising,
   (b) a mandrel,
   (c) outer hubs encircling the mandrel and disposed at the ends of the same,
   (d) inner hubs encircling the mandrel and being disposed inwardly of the outer hubs,
   (e) said inner hubs being spaced from one another to form an annular space therebetween,
   (f) a rotating, locking member disposed in said annular space and rotatable about the axis of said mandrel,
   (g) one of said inner hubs having a number of openings therein circumferentially spaced and disposed in a circle whose center lies in the axis of said mandrel,
   (h) the other of said inner hubs having similar openings circumferentially spaced from the openings in the first inner hub,
   (i) the outer hubs having openings registering with the openings in the inner hubs, which they face,
   (j) the spaces between the openings of each of said inner hubs registering with and exposing the openings in the adjoining inner hub,
   (k) said locking device having an opening therein adapted to register with any of the openings in either of said inner hubs, and when in one position having portions blocking all of the openings in said hubs,
   (l) spindles insertable through the opening in said locking member and into the openings in said inner hubs,
   (m) said spindles being slidable through the openings in said inner hubs and adapted to enter the corresponding openings in said outer hubs,
   (n) shoulders on said spindles limiting continued sliding movement of said spindles,
   (o) said locking member engaging the ends of said spindles and, when in its denoted position, restraining reverse sliding movement of said spindles,
   (p) ground engaging wheels carried by said frame,
   (q) bearings on said frame,
   (r) a shaft journalled in said bearings and carrying said mandrel,
   (s) means for driving said shaft, and
   (t) means for driving said mandrel from said shaft.

2. The combination according to claim 1 in which:
   (a) the mandrel is tubular, and
   (b) the shaft slides within the mandrel to assemble the parts.

3. The combination according to claim 1 in which:
   (a) the shaft is keyed to the mandrel and slidable along the same.

4. The combination according to claim 1 in which:
   (a) the mandrel is a many-sided tube, and
   (b) the shaft has parts conforming to the shape of the tube and slidable relative thereto.

5. The combination according to claim 1 in which:
   (a) the means for driving the mandrel and the shaft consists of a bushing rotatable in one of said bearings and to which the shaft is keyed.

6. The combination according to claim 1 in which:
   (a) the hubs are platelike in form, and
   (b) the locking member is platelike in form.

7. The combination according to claim 6 in which:
   (a) the hubs are polygonal in form, and
   (b) the openings therein are at the vertexes of same to leave the space therebetween open to permit of inserting the spindles for the opposite hub into the openings therein.

8. The combination according to claim 6 in which:
   (a) the hubs are triangular in form.

9. The combination according to claim 6 in which:
   (a) the mandrel has a passageway therethrough substantially square in cross section,
   (b) the cross section of the shaft is substantially square to conform to the passageway in the mandrel, and
   (c) the shaft slides in the mandrel and drives the mandrel.

References Cited

UNITED STATES PATENTS

| | | | |
|---|---|---|---|
| 2,111,478 | 3/1938 | McGuire | 172—21 |
| 2,633,687 | 4/1953 | Bannister | 172—45 X |

ABRAHAM G. STONE, *Primary Examiner.*

S. C. PELLEGRINO, *Assistant Examiner.*

U.S. Cl. X.R.

172—21